United States Patent
Olson (10) Patent No.: US 6,203,234 B1
(45) Date of Patent: *Mar. 20, 2001

(54) AUTOMATIC PISTON LOCK MECHANISM

(75) Inventor: David S. Olson, Granger, IN (US)

(73) Assignee: United Fixtures Company, Niles, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/344,855

(22) Filed: Jun. 28, 1999

Related U.S. Application Data (63) Continuation of application No. 08/907,545, filed on Aug. 8, 1997, now Pat. No. 5,938,367.

(51) Int. Cl.[7] ....................................................... F16B 9/00
(52) U.S. Cl. ............................ 403/254; 403/316; 211/192
(58) Field of Search .................................... 211/192, 191; 243/222.11, 222.41; 403/247, 254, 255, 328, 324, 327, 315, 316, 139, 345, 349, 353

(56) References Cited

U.S. PATENT DOCUMENTS

| | | | |
|---|---|---|---|
| 702,589 | * 6/1902 | Rast | 403/324 X |
| 3,273,720 | * 9/1966 | Seiz | 211/192 |
| 3,330,583 | * 7/1967 | Kennedy et al. | 403/325 |
| 3,392,848 | * 7/1968 | McConnell et al. | 211/192 |
| 3,612,290 | * 10/1971 | Evans | 211/192 |
| 3,697,034 | * 10/1972 | Shell | 211/192 X |
| 3,702,137 | * 11/1972 | Evans | 211/192 |
| 4,074,812 | * 2/1978 | Skubic et al. | 211/192 |
| 4,536,904 | * 8/1985 | Whitehead | 403/254 X |
| 4,917,442 | * 4/1990 | Johnson | 403/328 X |
| 4,955,743 | * 9/1990 | King | 403/254 |
| 5,237,791 | * 8/1993 | Scanlan | 211/192 X |
| 5,494,246 | * 2/1996 | McCarthy et al. | 211/192 X |
| 5,938,367 | * 8/1999 | Olson | 403/254 |

FOREIGN PATENT DOCUMENTS

2044079 * 10/1980 (GB) ................................. 211/192

* cited by examiner

Primary Examiner—Harry C. Kim
(74) Attorney, Agent, or Firm—Barnes & Thornburg

(57) ABSTRACT

An automatic lock mechanism is provided for locking adjustable frame system components together. A locking mechanism includes a locking pin having a shaft, a head and a biasing spring cooperates with a stud and slot locking mechanism. A stud is inserted into a slot, for example, a teardrop shaped slot, and then moved to the direction of insertion. The locking pin then extends into slot, preventing inadvertent upward movement of the horizontal member.

108 Claims, 3 Drawing Sheets

FIG. 6

AUTOMATIC PISTON LOCK MECHANISM

The present application is a continuation of U.S. patent application Ser. No. 08/907,545 filed Aug. 8, 1997, now U.S. Pat. No. 5,938,367.

BACKGROUND AND SUMMARY OF THE INVENTION

The present invention relates to adjustable frame systems, and particularly to a mechanism for locking adjustable frame system components together after installation. More particularly, the present invention relates to a locking assembly for adjustable, modular frame systems that locks the frame system components together after installation.

In a conventional modular frame system there are vertical support members, or upright columns, that interconnect with horizontal support members, or beams. The upright columns have vertically extending rows of slots and the beams have spaced apart studs, pins or tabs that insert into the slots. The beam is connected to the column by first inserting the studs into an upper portion of the slots and then sliding the studs downward into a lower portion of the slots. When the beam is so connected, a portion of the stud projects radially beyond the slot to secure the beam from axially disengaging from the column, i.e., the beam can only be disconnected by reversing the connection sequence.

Once the beam is connected to the column by inserting the studs into the upper slot portions and sliding them into the lower slot portions, the beam will remain secured to the column so long as there is a downward force on the pins or tabs. There are situations, however, where the beam can accidentally become disengaged from the column. For instance, if a person or machine exerts a lifting force on the beam greater than the load on the beam, the studs will slide upward and the beam can accidentally disengage from the column. During unexpected motion of the modular frame when an object strikes the frame, or when the frame is subject to vibrational loads, it is possible that the beam will move vertically relative to the column and become disengaged. To prevent inadvertent disengagement of the beam from the column, it is therefore desirable to lock the beam in place once the pins or tabs have been installed into the lower portions of the slots.

Users of modular frame systems often need to change the configuration of the frame by adjusting the locations where beams are attached to the columns. What is needed is a locking apparatus to facilitate releasably locking the studs or pins against vertical movement after they have been installed in the lower portion of the slots. It would be beneficial if such a locking apparatus would be automatic, that is, connection of the beam to the column by installation of the studs into the lower openings of the slots would automatically actuate the locking mechanism. It would further be beneficial if no tools were required to disengage the locking mechanism. Such an apparatus should furthermore be readily adapted for use with conventional modular frame components.

According to the present invention, a locking apparatus is provided for releasably locking first and second modular frame components together. The first frame component including a row of spaced apart slots. The second frame component includes a plurality of studs that extend from the second frame component. The studs can be inserted axially into the slots to a first position and then moved to a second position in the slots. The locking apparatus includes a locking pin and a biasing spring. The locking pin is coupled to the second frame component and is movable between an extended position and a retracted position. In the extended position the locking pin extends past an edge of the second frame component. In the retracted position the locking pin does not extend past the edge of the second frame component. The biasing spring is coupled to the locking pin to bias the locking pin to the extended position.

According to another aspect of the present invention, a locking apparatus is provided for releasably locking first and second frame components together. The first frame component includes a row of spaced apart slots having first and second slot portions. The locking apparatus includes a bracket or end connector, a plurality of studs, a locking pin, and a biasing spring. The bracket is coupled to the second frame component. The studs are coupled to the bracket and configured to enter the slots. Each stud includes a shaft and a head. The first and second frame components have a linked configuration defined when the heads of the studs are inserted through the first slot portions and the shafts are moved into the second slot portions. The locking pin is coupled to the bracket and is movable between an extended position and a retracted position. In the extended position the locking pin enters a first slot portion when the first and second frame components are in the linked configuration. In the retracted position the locking pin does not enter an opening in the first frame component. The biasing spring is coupled to the locking pin to bias the locking pin to the extended position.

According to yet another aspect of the present invention, a locking apparatus for releasably locking first and second frame components together is provided. The first frame component includes a row of slots spaced apart by a fixed distance. The second frame component includes at least one stud configured to enter one of the slots and an edge defining an opening. The locking apparatus includes a locking pin with a shaft having a shaft diameter sized to pass through the opening. The locking pin further has a head coupled to the shaft and having a head diameter greater than the shaft diameter. The locking pin is movable between an extended position where the locking pin shaft extends through the opening and a retracted position where the locking pin shaft does not extend beyond the edge defining the opening.

Additional features of the present invention will become apparent to those skilled in the art upon consideration of the following detailed description of preferred embodiments exemplifying the best mode of carrying out the invention as presently perceived.

DETAILED DESCRIPTION

Figure 1:
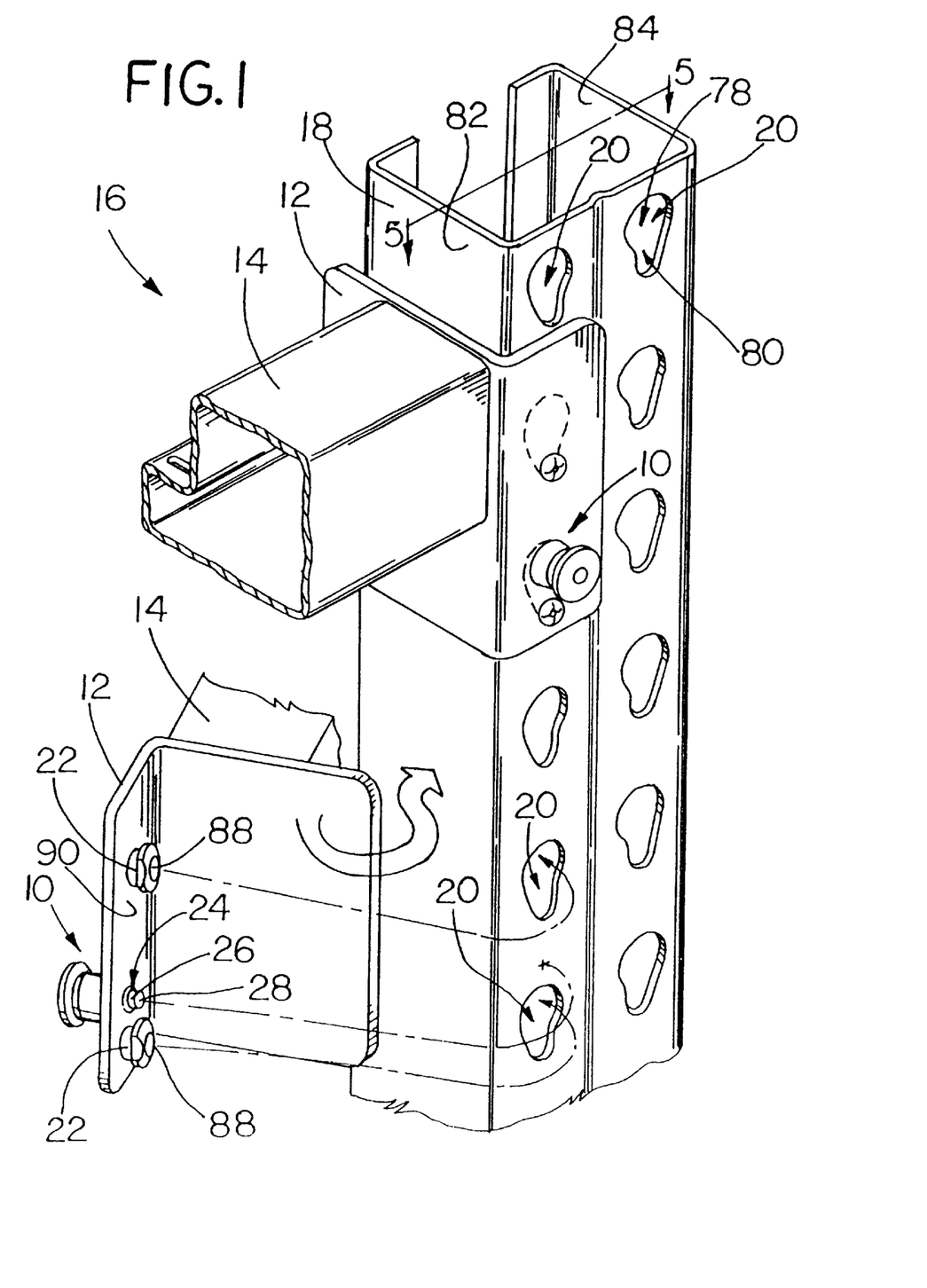
FIG. 1 is a perspective view showing an upright column and two beams in a modular frame system, the beams having a preferred embodiment of the locking apparatus of the present invention coupled to a bracket or end connector on the beam, with one beam installed onto the column and the other beam pulled away to show a locking pin and two studs that insert into slots in the column.

A locking apparatus 10 according to the present invention is attached to an end connector, or bracket or end connector 12 that is attached to a beam 14 in a standard modular frame system 16 as shown in FIG. 1. The modular frame system 16 includes horizontal members or beams 14 and vertical members or upright columns 18. The upright column 18 has a row of slots 20 that defines a plurality of locations where the beam 14 can link with the column 18. The end connector 12 includes studs 22 that are inserted into the slots 20 to attach the beam 14 to the column 18 in a linked configuration at a desired location. The beam 14 and column 18 are unlinked by disengaging the studs 22 from the slots 20.

Figure 6:
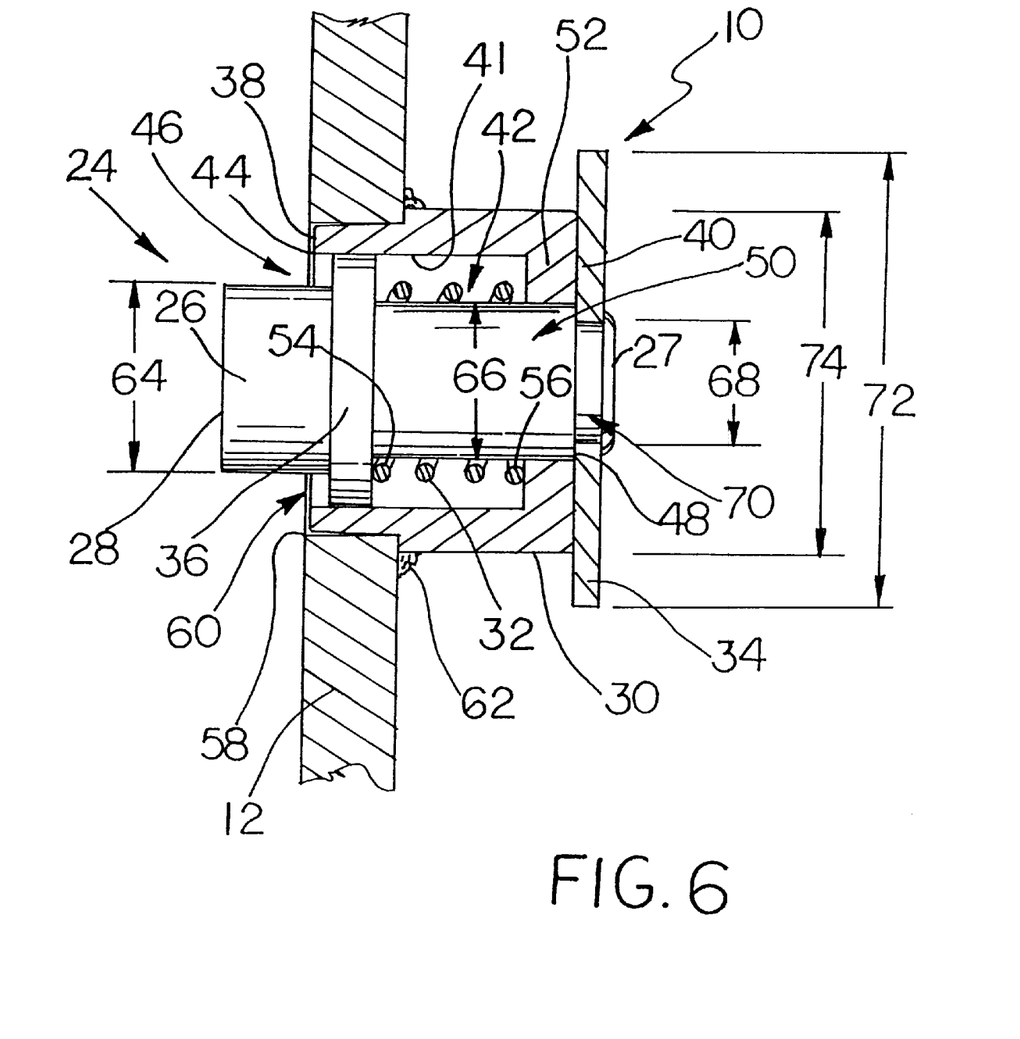
FIG. 6 is an enlarged sectional view of the preferred embodiment of the locking apparatus of the present invention.

In one embodiment, the locking apparatus 10 according to the present invention includes a locking pin 24, a housing 30, and a spring 32 as best shown in FIG. 6. The locking pin 24 is configured to move axially within the housing 30, and the housing 30 and the spring 32 couple the locking pin 24 to the end connector 12 and bias the locking pin 24 in a spring bolt configuration. The locking pin 24 is configured to releasably lock the beam 14 and column 18 together when the studs 22 are in the linked configuration.

Figures 2, 3, 4, 5:
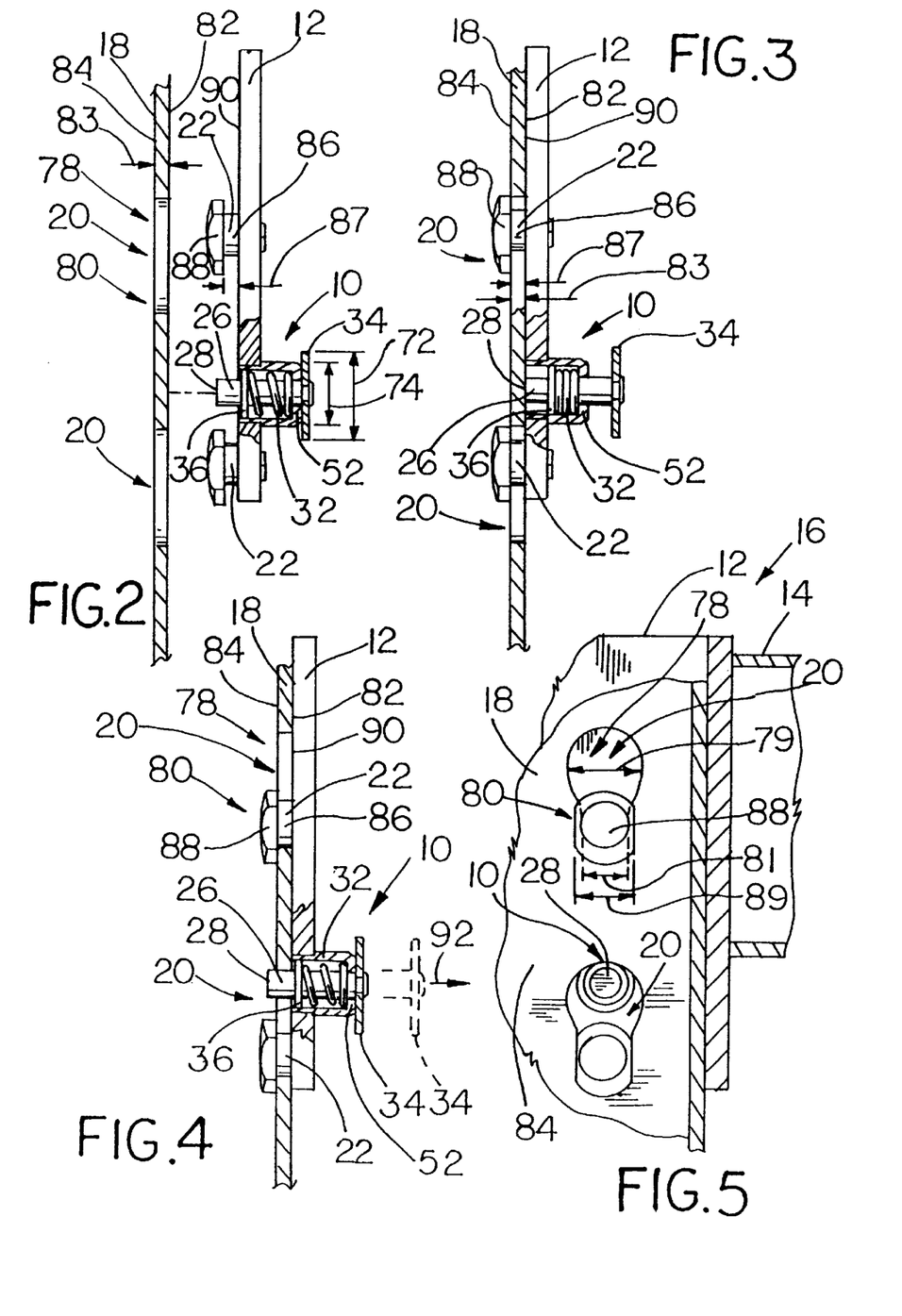
FIG. 2 is a sectional view showing slots in a column wall and a side view of the bracket having two studs positioned for insertion into the slots in the column and with a region cut away to show a locking pin coupled to the end connector and biased to an extended position by a biasing spring.
FIG. 3 is a view similar to FIG. 2 showing the studs inserted in an upper portion of the slots and the locking pin in a retracted position.
FIG. 4 is a view similar to FIG. 2 showing the studs positioned in a lower portion of the slots and the locking pin in the extended position and extending into the upper portion of the slots to lock the end connector to the column.
FIG. 5 is a partial sectional view taken along line 5—5 of FIG. 1 showing the studs in the lower portion of the slots and the locking pin extended into the upper portion of one of the slots.

The locking pin 24 includes a shaft 26 having an end 27, an end 28, and a flange 36. A head 34 is coupled to shaft 26 adjacent end 27. The flange 36 extends radially outwardly from the shaft 26 and is spaced apart from the end 28 and the head 34. The shaft 26 of locking pin 24 is positioned within the housing 30 and is movable between an extended position and a retracted position. In the extended position, the end 28 of the shaft 26 protrudes from the housing 30, as shown in FIG. 2, and in the retracted position the end 28 does not protrude from the housing 30, as shown in FIG. 3. When the studs 22 are in the linked configuration and the locking pin shaft 26 is in the extended position, as shown in FIGS. 4 and 5, shaft 26 extends into one of the slots 20 to prevent movement of the studs 22 sufficient for disengagement of the studs 22 from the slots 20, thus locking the beam 14 and column 18 together against disengagement. The beam 14 and column 18 can be unlocked by moving the locking pin shaft 26 to the retracted position as shown by the dashed lines in FIG. 4, thereby allowing removal of the studs 22 from the slots 20 to disengage the beam 14 from the column 18.

In this embodiment, the locking pin shaft 26 may be cylindrical, the head 34 is a disc, and the flange 36 is annular. As shown in FIG. 6, the locking pin shaft 26 is further formed with a first diameter 64 between the distal end 28 and the flange 36 and a second diameter 66 between the flange 36 and the head 34. As is shown in the figure, first diameter 64 is greater than or equal to second diameter 66. However, the present invention is not limited by this configuration. In other embodiments, diameter 64 and diameter 66 may be substantially the same. Diameter 64 may be less than diameter 66. Furthermore, the locking pin shaft is formed with a third diameter 68 at the end 27. The locking pin head 34 includes a central aperture 70 sized to receive the end 27 of the shaft 26, and the head 34 is coupled to the shaft 26 by staking or swaging the end 27. Any suitable means of coupling the head 34 to the shaft 26 is contemplated, however, such as welding, use of threads (not shown) on the proximal end 27 of the shaft 26 to couple with a thread-engaging surface (not shown) adjacent the opening 70 in locking pin head 34, adhesives, hot or cold forming, etc.

It is understood that any suitable locking pin configuration that provides for movement between a retracted position and an extended position is contemplated, such as a locking pin having a square, hexagonal, octagonal, partially rounded, or arbitrarily formed shaft (not shown). It is further understood that although FIGS. 1–6 show the locking pin 24 configured to lock the beam 14 and column 18 together by extending into one of the slots 20 entered by the studs 22, the invention contemplates the locking pin 24 entering a slot 20 that is not entered by one of the studs 22, or entering a separate aperture (not shown) in the column 18 apart from the row of slots. Furthermore, although the present embodiment describes a vertical column 18 having slots 20 and a horizontal beam 14 having studs 22, it is understood that the invention contemplates other orientations, such as two frame system components linked in a horizontal plane (not shown), or a vertical member having pins or tabs and the horizontal member having slots (not shown).

Referring now to FIG. 6, the locking pin housing 30 includes a first end 38 spaced apart from a second end 40 and an inner surface 41 defining a cylindrical cavity 42 between the first and second ends 38, 40. The housing 30 further includes a first edge 44 defining a first opening 46 to the cavity 42 at the first end 38 and a second edge 48 defining a second opening 50 to the cavity 42 at the second end 40. The first opening 46 has the same diameter as the cylindrical cavity 42 so that the housing inner surface 41 extends effectively straight through the housing first end 38. The second opening 50 has a diameter smaller than the diameter of the cylindrical cavity 42 so that there is an annular rim 52 at the second end 40 of the housing 30.

Still referring to FIG. 6, the bracket 12 is formed to include an edge 58 defining an aperture 60 sized to receive the first end 38 of the housing 30. The housing 30 is coupled to the bracket end connector 12 adjacent first end 38 so that the housing cavity 42 opens to the aperture 60 in the end connector 12. In one embodiment the housing 30 and end connector 12 are formed from metal such as steel or aluminum and are coupled together by a weld 62, or can be pressed and staked. The invention contemplates, however, components made of any suitable material, for example the housing 30 and end connector 12 can be formed from plastic or a composite material. It is further understood that any suitable mechanism can be used for coupling the housing 30 to the bracket 12, such as use of adhesives, a compression fit, or threads (not shown) formed adjacent the first end 38 of the housing 30 that couple to a threaded-receiving surface adjacent the aperture (not shown) in the end connector 12.

The locking pin head 34 is formed to be larger than the second opening 50 of the housing 30 to prevent head 34 from passing through opening 50. See FIG. 6. In the preferred embodiment, the diameter 72 of head 34 is greater than the outside diameter 74 of the housing 30. Forming the head 34 with a diameter 72 greater than the diameter 74 of the housing 30 facilitates easy gripping the locking pin head 34 for movement of the locking pin 24 to the retracted position. It is understood that the diameter 72 of the locking pin head 34 can be equal to or smaller than the outside diameter 74 of the housing 30.

The locking pin 24 is positioned in the housing 30 with the head 34 lying outside the housing 30 and the shaft 26 extending through the second opening 50 into the housing cavity 42. In the preferred embodiment, the shaft 26 is coaxial with the housing 30 and housing cavity 42. When the locking pin 24 is in the extended position the head 34 lies adjacent the second end 40 of the housing 30 and the distal end 28 of the locking pin shaft 26 extends outside the cavity at the first end 38 of the housing 30, as shown for example in FIG. 2. When the locking pin 24 is in the retracted position the head 34 extends away from the housing 30 and the distal end 28 of the locking pin shaft 26 lies within the cavity 42 of housing 30, as shown for example in FIG. 3. Although in the preferred embodiment the distal end 28 of shaft 26 lies within cavity 42 in the retracted position, the invention requires only that the shaft 26 retract sufficiently to permit disengaging the studs 22 from the slots 20.

The spring 32 is positioned to lie within the housing 30 between the flange 36 of locking pin shaft 26 and the rim 52 of the housing 30. See FIGS. 2–4 and 6. As shown in FIG. 6, the spring 32 includes a first end 54 that lies adjacent flange 36 and a second end 56 that lies adjacent rim 52. Spring 32 biases locking pin shaft 26 to the extended position so that distal end 28 extends outside housing 30 as best shown in FIGS. 2 and 4. Although the spring 32 is a metal coil spring in the preferred embodiment, the invention contemplates any type of spring or biasing means that biases locking pin shaft 26 to the extended position, e.g., a flat metal spring, or a spring formed from other materials, such as plastic, composites, or a compressible material.

The column 18 has an outer surface 82 spaced apart from an inner surface 84 by a column wall thickness 83 and is formed as a tube with a generally square cross-section. See FIG. 1. The slots 20 in column 18 have a teardrop shape with an upper portion 78 having an upper diameter 79 connected to a lower portion 80 having a lower diameter 81 that is smaller than the upper diameter 79. See FIGS. 1 and 5. The studs 22 are formed with a shaft 86 that extends from an outside surface 90 the bracket 12 and a head 88 coupled to the shaft. The stud shaft has a length 87 that is generally greater than the column wall thickness 83, as best shown in FIG. 3, and the stud head 88 has a truncated circular shape with a head diameter 89, as best shown in FIG. 5. The stud head diameter 89 is shown smaller than the upper slot diameter 79 but larger than the lower slot diameter 81. This allows for axial insertion of the stud head 88 into the upper slot portion 78 while preventing head 89 from axial disengagement from the lower slot portion 80. Although the beam 14 and column 18 in the preferred embodiment are linked by hex-shaped pins 22 inserted into teardrop shaped slots 20, the invention contemplates any suitable linking configuration, such as flat tabs that insert into narrow slots (not shown).

The beam 14 is linked and locked to the column 18 as shown in FIGS. 2–4. First the studs 22 are aligned with the upper portions 78 of the slots 20 as shown in FIG. 2. Then the studs 22 are axially inserted into the upper portions 78 of slots 20 until the outside surface 90 of end connector 12 abuts the outer surface 82 of column 18 as shown in FIG. 2. In this position, the end 28 of the locking pin shaft 26 abuts outer surface 82, causing the spring 32 to compress and the locking pin shaft 26 to move to the retracted position. Next, the studs 22 are moved downwardly into the lower portions 80 of the slots 20. The locking apparatus 10 is spaced apart from the studs 22 so that when the studs 22 are in the lower slot portions 80, the locking pin shaft 26 is aligned with the upper slot portion 78 of one of the slots 20. In this position, the spring 32 causes the spring bolt action of locking apparatus 10 to extend the shaft 26 into the upper slot portion 78 automatically. In the extended position, the position of locking pin shaft 26 in the upper slot portion 78 prevents studs 22 from vertical movement out of the lower slot portions 80, and the stud heads engage the inner wall 84 of column 18 to prevent axial movement, thus locking the beam 14 to the column 18 in a linked and locked configuration.

It is understood that location of the locking pin shaft 26 in the upper slot portion 78 can vary as long as the locking pin shaft 26 prevents the studs 22 from moving vertically so far that the studs 22 completely leave the lower slot portions 80, that is, as long as the stud heads 88 continue to extend over the inner surface 84 of the column 18 to prevent axial disengagement of the beam 14. It is further understood that the invention contemplates the locking pin shaft 26 entering any aperture within column 18 when the beam 14 and column 18 are in the linked configuration. For example, the locking apparatus 10 could be positioned so that the locking pin shaft 26 enters the upper slot portion 78 of a slot 20 that is not entered by a stud 22. Similarly, the locking apparatus 10 can be positioned so that the locking pin shaft 26 enters an aperture (not shown) apart from the slots 20 defined by an edge (not shown) that engages the locking pin shaft 26 to prevent the studs 22 from moving vertically out of the lower slot portions 80 when the locking pin shaft 26 is in the extended position.

Beam 14 is unlocked and unlinked from column 18 as follows. First the locking pin shaft 26 is moved to the retracted position. As shown in FIG. 4, movement of the locking pin head 34 in a direction 92 away from slot 20 will move the locking pin shaft 26 to the retracted position. This allows for movement of the studs 22 vertically from the lower slot portions 80 to the upper slot portions 78, from which position the beam 14 can be axially disengaged from the column 18. The locking pin housing 30 and head 34 are configured to provide a convenient mechanism for grasping the head 34 and moving the locking pin shaft 26 to the retracted position, without the need for any tools.

Locking apparatus 10 of the present invention may also be used with brackets or end connectors 12 having a different number of pins or studs 22. For example, locking apparatus 10 could be used in conjunction with end connectors 12 which include 3 or 4 studs 22. In fact, locking apparatus 10 could be used in conjunction with an end connector 12 having any number of pins or studs 22. In such cases, a single locking apparatus 10 may be employed, or multiple locking apparatus 10 may be used with a single end connector 12.

Although the invention has been described in detail with reference to a preferred embodiment, variations and modifications exist within the scope and spirit of the invention as described and defined in the following claims.

What is claimed is:

1. An adjustable frame system, comprising:
    a first frame component including a row of spaced apart slots;
    a second frame component including at least two studs adapted for insertion into the slots and an aperture;
    a locking pin having a head coupled to a shaft, the shaft also having an end distal from the head, and the shaft being movable between an extended position and a retracted position;
    a housing coupling the locking pin to the second frame component; and
    a spring coupled between the locking pin and the housing to bias the locking pin into the extended position;

wherein the housing extends into the aperture in the second frame component;

wherein the end of the locking pin extends past an edge of the second frame component when in the extended position and does not extend past the edge of the second frame component when in the retracted position; and wherein the head is extended outside the housing distal from the edge of the second frame when the pin is in the extended and retracted positions.

2. The adjustable frame system of claim 1, wherein the housing is annular.

3. The adjustable frame system of claim 1, wherein the spring is a coil spring.

4. The adjustable frame system of claim 1, wherein the spring is enclosed within the housing.

5. The adjustable frame system of claim 1, wherein the housing has an outer diameter and the head has a diameter at least as large as the housing outer diameter.

6. The adjustable frame system of claim 1, wherein the locking pin has an axis of symmetry and the spring has an axis of symmetry which is substantially coaxial with the locking pin axis of symmetry.

7. The adjustable frame system of claim 1, wherein the locking pin, the housing, and the spring are substantially coaxial.

8. The adjustable frame system of claim 1, wherein the locking pin in the extended position extends into a slot entered by one of the studs.

9. The adjustable frame system of claim 1, wherein the housing further comprises a first end, a second end, and a cavity between the first and second ends, the housing being coupled to the second frame component adjacent the housing first end, the locking pin head being positioned outside the second end of the housing, and the distal end of the shaft being positioned adjacent the housing cavity in the retracted position and extending outside the first end of the housing in the extended position.

10. The adjustable frame system of claim 9, wherein the locking pin shaft is cylindrical.

11. The adjustable frame system of claim 9, wherein the housing cavity is cylindrical.

12. The adjustable frame system of claim 9, wherein the locking pin shaft includes a flange spaced apart from the locking pin head.

13. The adjustable frame system of claim 12, wherein the spring engages the locking pin flange.

14. The adjustable frame system of claim 12, wherein the flange includes a first side facing the locking pin head and a second side facing the locking pin distal end, the spring being compressed between the flange first side and the housing.

15. The adjustable frame system of claim 12, wherein the locking pin distal end has an outer diameter, the flange has an outer diameter, and the locking pin head has an outer diameter, the flange outer diameter being smaller than the head outer diameter, and the distal end outer diameter being smaller than the flange outer diameter.

16. An adjustable frame system, comprising:

a first frame component including a plurality of slots;

a second frame component including a plurality of studs adapted for insertion into the slots and an aperture;

a housing;

a locking pin having a head coupled to a shaft, the shaft also having an end distal from the head, and the shaft being operably coupled to the second frame component, the locking pin being movable between an extended position wherein the end extends through the aperture in the second frame component past an edge of the second frame component and a retracted position wherein the end does not extend past the edge of the second frame component, the head is extended outside the housing distal from the edge of the second frame when the pin is in the extended and retracted positions; and a spring coupled to the locking pin to bias the locking pin into the extended position;

wherein the housing extends into the aperture in the second frame component and couples the locking pin to the second frame component.

17. The adjustable frame system of claim 16, wherein the spring is a coil spring.

18. The adjustable frame system of claim 16, wherein the locking pin has an axis of symmetry and the spring has and axis of symmetry which is substantially coaxial with the locking pin axis of symmetry.

19. The adjustable frame system of claim 16, wherein the locking pin in the extended position extends into a slot entered by one of the studs.

20. The adjustable frame system of claim 16, wherein the spring is coupled between the locking pin and the housing.

21. The adjustable frame system of claim 16, wherein the housing is annular.

22. The adjustable frame system of claim 16, wherein the spring is enclosed within the housing.

23. The adjustable frame system of claim 16, wherein the housing has an outer diameter and the head has a diameter at least as large as the housing outer diameter.

24. The adjustable frame system of claim 16, wherein the locking pin, the housing, and the spring are substantially coaxial.

25. The adjustable frame system of claim 16, wherein the housing further comprises a first end, a second end, and a cavity between the first and second ends, the housing being coupled to the second frame component adjacent the housing first end, the locking pin head being positioned outside the second end of the housing, and the distal end of the shaft being positioned adjacent the housing cavity in the retracted position and extending outside the first end of the housing in the extended position.

26. The adjustable frame system of claim 25, wherein the locking pin shaft is cylindrical.

27. The adjustable frame system of claim 25, wherein the housing cavity is cylindrical.

28. The adjustable frame system of claim 25, wherein the locking pin shaft includes a flange spaced apart from the locking pin head.

29. The adjustable frame system of claim 28, wherein the spring engages the locking pin flange.

30. The adjustable frame system of claim 28, wherein the flange includes a first side facing the locking pin head and a second side facing the locking pin distal end, the spring being compressed between the flange first side and the housing.

31. The adjustable frame system of claim 28, wherein the locking pin distal end has an outer diameter, the flange has an outer diameter, and the locking pin head has an outer diameter, the flange outer diameter being smaller than the head outer diameter, and the distal end outer diameter being smaller than the flange outer diameter.

32. An adjustable frame system, comprising:

a first frame component including a plurality of slots;

a second frame component including a plurality of studs adapted for insertion into the slots and an aperture;

a housing;

a locking pin having a head coupled to a shaft, the shaft also having an end distal from the head, and the shaft being operably coupled to the second frame component, the locking pin being movable between an extended position wherein the end extends past an edge of the second frame component and a retracted position wherein the end does not extend past the edge of the second frame component, the head is extended outside the housing distal from the edge of the second frame when the pin is in the extended and retracted positions; and a spring coupled to the locking pin to bias the locking pin to the extended position, the spring being enclosed within the housing;

wherein the housing extends into the aperture in the second frame component and couples the locking pin to the second frame component.

33. The adjustable frame system of claim 32, wherein the housing is annular.

34. The adjustable frame system of claim 32, wherein the spring is a coil spring.

35. The adjustable frame system of claim 32, wherein the spring is enclosed within the housing.

36. The adjustable frame system of claim 32, wherein the housing has an outer diameter and the head has a diameter at least as large as the housing outer diameter.

37. The adjustable frame system of claim 32, wherein the locking pin has an axis of symmetry and the spring has and axis of symmetry which is substantially coaxial with the locking pin axis of symmetry.

38. The adjustable frame system of claim 32, wherein the locking pin, the housing, and the spring are substantially coaxial.

39. The adjustable frame system of claim 32, wherein the locking pin in the extended position extends into a slot entered by one of the studs.

40. The adjustable frame system of claim 32, wherein the housing further comprises a first end, a second end, and a cavity between the first and second ends, the housing being coupled to the second frame component adjacent the housing first end, the locking pin head being positioned outside the second end of the housing, and the distal end of the shaft being positioned adjacent the housing cavity in the retracted position and extending outside the first end of the housing in the extended position.

41. The adjustable frame system of claim 40, wherein the locking pin shaft is cylindrical.

42. The adjustable frame system of claim 40, wherein the housing cavity is cylindrical.

43. The adjustable frame system of claim 40, wherein the locking pin shaft includes a flange spaced apart from the locking pin head.

44. The adjustable frame system or claim 43, wherein the spring engages the locking pin flange.

45. The adjustable frame system of claim 43, wherein the flange includes a first side facing the locking pin head and a second side facing the locking pin distal end, the spring being compressed between the flange first side and the housing.

46. The adjustable frame system of claim 43, wherein the locking pin distal end has an outer diameter, the flange has an outer diameter, and the locking pin head has an outer diameter, the flange outer diameter being smaller than the head outer diameter, and the distal end outer diameter being smaller than the flange outer diameter.

47. An adjustable frame system, comprising:

a first frame component including a plurality of slots;

a second frame component including a plurality of studs adapted for insertion into the slots and an aperture;

a housing;

a locking pin having a head coupled to a shaft, the shaft also having an end distal from the head, and the shaft being operably coupled to the second frame component, the locking pin being movable between an extended position wherein the end of the locking pin extends through an aperture in the second frame component past an edge of the second frame component and a retracted position wherein the end does not extend past the edge of the second frame component, the head is extended outside the housing distal from the edge of the second frame when the pin is in the extended and retracted positions; and a spring coupled between the locking pin and the housing to bias the locking pin to the extended position, the spring being enclosed within the housing;

wherein the housing extends into the aperture in the second frame component and couples the locking pin to the second frame component.

48. The adjustable frame system of claim 47, wherein the housing is annular.

49. The adjustable frame system of claim 47, wherein the spring is a coil spring.

50. The adjustable frame system of claim 47, wherein the housing has an outer diameter and the head has a diameter at least as large as the housing outer diameter.

51. The adjustable frame system of claim 47, wherein the locking pin has an axis of symmetry and the spring has an axis of symmetry which is substantially coaxial with the locking pin axis of symmetry.

52. The adjustable frame system of claim 47, wherein the locking pin, the housing, and the spring are substantially coaxial.

53. The adjustable frame system of claim 47, wherein the locking pin in the extended position extends into a slot entered by one of the studs.

54. The adjustable frame system of claim 47, wherein the housing further comprises a first end, a second end, and a cavity between the first and second ends, the housing being coupled to the second frame component adjacent the housing first end, the locking pin head being positioned outside the second end of the housing, and the distal end of the shaft being positioned adjacent the housing cavity in the retracted position and extending outside the first end of the housing in the extended position.

55. The adjustable frame system of claim 54, wherein the locking pin shaft is cylindrical.

56. The adjustable frame system of claim 54, wherein the housing cavity is cylindrical.

57. The adjustable frame system of claim 54, wherein the locking pin shaft includes a flange spaced apart from the locking pin head.

58. The adjustable frame system or claim 57, wherein the spring engages the locking pin flange.

59. The adjustable frame system of claim 57, wherein the flange includes a first side facing the locking pin head and a second side facing the locking pin distal end, the spring being compressed between the flange first side and the housing.

60. The adjustable frame system of claim 57, wherein the locking pin distal end has an outer diameter, the flange has an outer diameter, and the locking pin head has an outer diameter, the flange outer diameter being smaller than the head outer diameter, and the distal end outer diameter being smaller than the flange outer diameter.

61. An adjustable frame system, comprising:
a first frame component including a row of spaced apart slots;
a second frame component including at least two studs adapted for insertion into the slots;
a substantially cylindrical housing mounted to the second frame component, the housing having a substantially cylindrical cavity extending between a first end of the housing and a second end of the housing;
a locking pin extending through the housing cavity, the locking pin having a shaft having a diameter, a first end with a head having a diameter larger than the shaft diameter, and a second end having a diameter smaller than the shaft diameter, the locking pin being movable between a retracted position wherein the locking pin second end is adjacent the housing first end and an extended position wherein the locking pin second end is spaced away from the housing first end; and
a spring coupled between the locking pin and the housing to bias the locking pin into the extended position.

62. The adjustable frame system of claim 61, wherein the housing extends into an aperture in the second frame member.

63. The adjustable frame system of claim 61, wherein the spring is a coil spring.

64. The adjustable frame system of claim 61, wherein the spring is enclosed within the housing.

65. The adjustable frame system of claim 61, wherein the housing has an outer diameter, the locking pin head being disposed outside the housing, and the locking pin head diameter being at least as large as the housing outer diameter.

66. The adjustable frame system of claim 61, wherein the locking pin has an axis of symmetry and the spring has an axis of symmetry which is substantially coaxial with the locking pin axis of symmetry.

67. The adjustable frame system of claim 61, wherein the locking pin, the housing, and the spring are substantially coaxial.

68. The adjustable frame system of claim 61, wherein the locking pin in the extended position extends into a slot entered by one of the studs.

69. The adjustable frame system of claim 61, wherein the housing is coupled to the second frame component adjacent the housing first end and the locking pin head is positioned outside the second end of the housing.

70. The adjustable frame system of claim 61, wherein the locking pin shaft is cylindrical.

71. The adjustable frame system of claim 61, wherein the locking pin shaft includes a flange spaced apart from the locking pin head.

72. The adjustable frame system of claim 71, wherein the spring engages the locking pin flange.

73. The adjustable frame system of claim 71, wherein the flange includes a first side facing the locking pin head and a second side facing the locking pin second end, the spring being compressed between the flange first side and the housing.

74. The adjustable frame system of claim 71, wherein the flange has a diameter, the flange diameter being smaller than the head diameter but larger than the shaft diameter.

75. An adjustable frame system, comprising:
a first frame component including a row of spaced apart slots;
a second frame component including at least two studs adapted for insertion into the slots;
a housing mounted to an aperture in the second frame component, the housing including a first end, a second end, and a cavity extending between the first and second ends;
a locking pin extending through the housing cavity being movable between a retracted position and an extended position, the locking pin having a shaft with a first end having a head which engages the housing second end when the locking pin is in the extended position, and a second end which extends past the housing first end when the locking pin is in the extended position; and
a spring enclosed within the housing cavity, the spring being coupled between the housing and the locking pin to bias the locking pin into the extended position.

76. The adjustable frame system of claim 75, wherein the housing extends into the aperture.

77. The adjustable frame system of claim 75, wherein the spring is a coil spring.

78. The adjustable frame system of claim 75, wherein the housing has an outer diameter, the locking pin head being disposed outside the housing, and the locking pin head diameter being at least as large as the housing outer diameter.

79. The adjustable frame system of claim 75, wherein the locking pin has an axis of symmetry and the spring has an axis of symmetry which is substantially coaxial with the locking pin axis of symmetry.

80. The adjustable frame system of claim 75, wherein the locking pin, the housing, and the spring are substantially coaxial.

81. The adjustable frame system of claim 75, wherein the locking pin in the extended position extends into a slot entered by one of the studs.

82. The adjustable frame system of claim 75, wherein the housing is coupled to the second frame component adjacent the housing first end and the locking pin head is positioned outside the second end or the housing.

83. The adjustable frame system of claim 75, wherein the locking pin shaft is cylindrical.

84. The adjustable frame system of claim 75, wherein the locking pin shaft includes a flange spaced apart from the locking pin head.

85. The adjustable frame system of claim 84, wherein the spring engages the locking pin flange.

86. The adjustable frame system of claim 84, wherein the flange includes a first side facing the locking pin head and a second side facing the locking pin second end, the spring being compressed between the flange first side and the housing.

87. The adjustable frame system of claim 84, wherein the flange has a diameter, the flange diameter being smaller than the head diameter but larger than the shaft diameter.

88. An adjustable frame system, comprising:
a first frame component including a plurality of slots;
a second frame component including a plurality of studs adapted for insertion into the slots;
a cylindrical housing mounted to an aperture in the second frame component, the housing extending substantially through the aperture and including a first end, a second end, and a cylindrical cavity between the first and second ends;
a locking pin including a shaft having a diameter extending through the housing cavity with a first end having a circular head disposed outside the housing adjacent the housing second end, and a second end having a reduced diameter relative to the shaft diameter, the locking pin being movable between an extended position wherein the locking pin head engages the housing first end and the locking pin second end is spaced a first distance from the housing first end, and a retracted position wherein the locking pin head does not engage the housing first end and the locking pin second end is spaced a second distance from the housing first end, the second distance being smaller than the first distance; and a spring enclosed within the housing cavity, the spring being coupled between the housing and the locking pin to bias the locking pin to the extended position.

89. The adjustable frame system of claim 88, wherein the housing extends into the aperture.

90. The adjustable frame system of claim 88, wherein the spring is a coil spring.

91. The adjustable frame system of claim 88, wherein the housing has an outer diameter and the locking pin head has a diameter which is at least as large as the housing outer diameter.

92. The adjustable frame system of claim 88, wherein the locking pin has an axis of symmetry and the spring has an axis of symmetry which is substantially coaxial with the locking pin axis of symmetry.

93. The adjustable frame system of claim 88, wherein the locking pin, the housing, and the spring are substantially coaxial.

94. The adjustable frame system of claim 88, wherein the locking pin in the extended position extends into a slot entered by one of the studs.

95. The adjustable frame system of claim 88, wherein the housing is coupled to the second frame component adjacent the housing first end and the locking pin head is positioned outside the second end of the housing.

96. The adjustable frame system of claim 88, wherein the locking pin shaft is cylindrical.

97. The adjustable frame system of claim 88, wherein the locking pin shaft includes a flange spaced apart from the locking pin head.

98. The adjustable frame system of claim 97, wherein the spring engages the locking pin flange.

99. The adjustable frame system of claim 97, wherein the flange includes a first side facing the locking pin head and a second side facing the locking pin second end, the spring being compressed between the flange first side and the housing.

100. The adjustable frame system of claim 97, wherein the flange has a diameter and the locking pin head has a diameter, the flange diameter being smaller than the head diameter but larger than the shaft diameter.

101. An adjustable frame system, comprising:

an upright column having spaced apart slots;

a beam having a longitudinal axis and a bracket at one end, the bracket having at least two studs adapted for insertion into the slots and an aperture;

a housing;

a locking pin having a head coupled to a shaft, the shaft also having an end distal from the head, and the shaft being operably coupled to the bracket, the locking pin having a longitudinal axis perpendicular to the beam axis, the locking pin being movable along a straight line between an extended position wherein the end extends into one of the slots receiving one of the studs when the beam is connected to the upright column, and a retracted position wherein the end does not extend into the one slot; and a spring coupled to the locking pin to bias the locking pin to the extended position;

wherein the housing extends into the aperture in the bracket and couples the locking pin to the bracket.

102. The adjustable frame system of claim 101, wherein the spring is a coil spring.

103. The adjustable frame system of claim 101, wherein the spring has an axis of symmetry which is substantially coaxial with the locking pin longitudinal axis.

104. The adjustable frame system of claim 101, wherein the locking pin head is positioned on one side of the bracket, the locking pin shaft extending through the bracket.

105. The adjustable frame system of claim 101, wherein the shaft is a cylindrical shaft and the head is a cylindrical head such that the cylindrical head has a diameter larger than a diameter of the cylindrical shaft.

106. The adjustable frame system of claim 101, wherein the shaft includes a flange connected to the shaft and being spaced apart from the locking pin head.

107. The adjustable frame system of claim 106, wherein the spring engages the locking pin flange.

108. The adjustable frame system of claim 101, wherein the bracket consists of a right angle bracket.

* * * * *